United States Patent
No et al.

(10) Patent No.: US 9,086,751 B2
(45) Date of Patent: Jul. 21, 2015

(54) DISPLAY DEVICE INCLUDING A TOUCH SENSOR

(75) Inventors: Sang-Yong No, Seoul (KR); Young-Je Cho, Cheonan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 1191 days.

(21) Appl. No.: 12/478,162

(22) Filed: Jun. 4, 2009

(65) Prior Publication Data

US 2010/0156847 A1   Jun. 24, 2010

(30) Foreign Application Priority Data

Dec. 19, 2008 (KR) ................ 2008-129821

(51) Int. Cl.
G06F 3/041 (2006.01)
G02F 1/1333 (2006.01)
G06F 3/042 (2006.01)
G02F 1/133 (2006.01)

(52) U.S. Cl.
CPC .......... *G06F 3/0412* (2013.01); *G02F 1/13338* (2013.01); *G06F 3/0416* (2013.01); *G06F 3/0421* (2013.01); *G02F 2001/13312* (2013.01)

(58) Field of Classification Search
CPC ..... G06F 3/0421; G06F 3/041; G06F 3/0416; G06F 3/0412; G06F 3/042; G06F 3/03545; G06F 3/0317; G02F 1/13338; G02F 2001/13312
USPC .......................... 345/104, 273–175
See application file for complete search history.

(56) References Cited

U.S. PATENT DOCUMENTS

| | | | |
|---|---|---|---|
| 2007/0222762 A1* | 9/2007 | Van Delden et al. | 345/173 |
| 2008/0001912 A1* | 1/2008 | Koide et al. | 345/102 |
| 2008/0129898 A1* | 6/2008 | Moon | 349/12 |
| 2008/0246708 A1* | 10/2008 | Ishiguro | 345/87 |
| 2008/0291430 A1* | 11/2008 | Nozawa | 356/73 |
| 2009/0073150 A1* | 3/2009 | Shih et al. | 345/207 |
| 2009/0189866 A1* | 7/2009 | Haffenden et al. | 345/173 |

FOREIGN PATENT DOCUMENTS

| | | | |
|---|---|---|---|
| JP | 2007-206625 A | 8/2007 |
| JP | 2008-083109 A | 4/2008 |
| KR | 1020040095941 A | 11/2004 |
| KR | 1020060056634 A | 5/2006 |
| WO | 2008143213 A1 | 11/2008 |

* cited by examiner

*Primary Examiner* — Towfiq Elahi
(74) *Attorney, Agent, or Firm* — Cantor Colburn LLP

(57) ABSTRACT

A display device includes; a first touch sensor, a second touch sensor disposed in proximity to the first touch sensor, a shade located on the second touch sensor wherein the shade controls intensity of incident light to the second touch sensor so that the second touch sensor receives a different intensity than the first touch sensor, and a reader which receives a first signal and a second signal from the first touch sensor and the second touch sensor, respectively and which analyzes the first signal and the second signal.

20 Claims, 10 Drawing Sheets

| 1C | 2C | 3C | 4C |
|---|---|---|---|
| A | 1 | 0 | 1 |
| B | 1 | 1 | 0 |
| C | 0 | 1 | 0 |
| D | 0 | 0 | 0 |

FIG. 7C

| | 1C | 2C | 3C | 4C |
|---|---|---|---|---|
| A | | 1 | 0 | 1 |
| B,C | | 0 | 1 | 0 |
| D | | 0 | 0 | 0 |

DISPLAY DEVICE INCLUDING A TOUCH SENSOR

This application claims priority to Korean Patent Application No. 10-2008-0129821, filed on Dec. 19, 2008, and all the benefits accruing therefrom under 35 U.S.C. §119, the contents of which in its entirety are herein incorporated by reference.

BACKGROUND OF THE INVENTION

1. Field of the Invention

The present invention relates to a display device including a touch sensor.

2. Description of Related Art

A typical liquid crystal display ("LCD") includes a pair of substrates provided with pixel electrodes and a common electrode and a liquid crystal layer with dielectric anisotropy interposed between the substrates. The pixel electrodes are typically arranged in a matrix and are connected to switching elements such as thin film transistors ("TFTs") such that the pixel electrodes receive image data voltages sequentially, row by row.

The common electrode typically covers the entire surface of one of the two substrates and is applied with common voltages. A pixel electrode, a corresponding portion of the common electrode, and a corresponding portion of the liquid crystal layer form a liquid crystal capacitor. The liquid crystal capacitor and a switching element connected thereto form a pixel unit. A plurality of pixel units is typically arranged in a matrix.

An LCD typically generates electric fields by applying voltages to the pixel electrodes and the common electrode and varies the strength of the electric fields in order to adjust the transmittance of light passing through the liquid crystal layer, thereby displaying images.

A touch screen panel is an apparatus on which a finger or a stylus is touched to write characters, to draw pictures, or to instruct a device such as a computer to execute instructions, e.g., by using icons. The touch screen panel has its own mechanism to determine whether or not a touch event exists, and if it does exist, its location on the touch screen panel may also be determined. The touch screen panel is typically attached to a display device such as an LCD. However, an LCD provided with a touch screen panel has a high manufacturing cost due to the cost of the touch screen panel, low productivity due to the additional step for attaching the touch screen panel to the LCD, reduction of the luminance of the LCD and increased thickness of the LCD.

Recently it has been studied that photo sensors have been incorporated on a substrate of an LCD instead of a touch screen panel. A photo sensor has been used to sense the intensity of incident light on a region of the display to give information as to whether or not and where a user's finger or other structure is touching the LCD, e.g., a touch event.

However, the characteristics of photo sensors depend on the uniformity of an amorphous silicon layer of the combined photo sensor and LCD. As a result, there may be errors in the light sensing function, depending on the area being sensed for a touch event. For example, an LCD having the photo sensor may have a malfunction in that it judges a touch that is not actually present as a touch event.

BRIEF SUMMARY OF THE INVENTION

The present invention provides a display having at least two touch sensors and a shade on one of the touch sensors.

An exemplary embodiment of a display device includes; a first touch sensor, a second touch sensor disposed in proximity to the first touch sensor, a shade located on the second touch sensor wherein the shade controls intensity of incident light to the second touch sensor so that the second touch sensor receives a different intensity than the first touch sensor, and a reader which receives a first signal and a second signal from the first touch sensor and the second touch sensor, respectively, and which analyzes the first signal and the second signal.

Another exemplary embodiment of a display device includes; a first touch sensor, a second touch sensor disposed in proximity to the first touch sensor, a shade located on the second touch sensor, wherein the shade controls intensity of incident light to the second touch sensor, so that the second touch sensor receives a different intensity than the first touch sensor, and a reader including; a first detector which receives a first signal from the first touch sensor, a second detector which receives the first signal and a second signal from the first touch sensor and the second touch sensor, respectively, and a comparator which compares a third signal from the first detector and a fourth signal from the second detector.

In one exemplary embodiment, the shade may be a color filter layer or a combination of a plurality of color filter layers.

In one exemplary embodiment, the display device further includes a plurality of pixel units arranged in a matrix pattern, wherein the first touch sensor and the second touch sensor are located between individual pixel units of the plurality of pixel units.

In one exemplary embodiment, the first touch sensor and the second touch sensor each include a photo sensor which senses incident light and a mechanical sensor which senses deformation of a liquid crystal layer, respectively.

In one exemplary embodiment, a first read-out line is electrically connected to the first touch sensor and a second read-out line is electrically connected to the second touch sensor.

In one exemplary embodiment, a first supply line may be electrically connected to the first touch sensor or both the first and second touch sensors. In an additional exemplary embodiment, a second supply line may be electrically connected to the second touch sensor.

In one exemplary embodiment, the display further includes; a first switch operated by the photo sensor and the mechanical sensor of the first touch sensor and electrically connected to the first supply line, and a second switch operated by a gate signal and electrically connected to the first switch and the reader.

In one exemplary embodiment, the mechanical sensor has a liquid crystal ("LC") capacitor and a reference capacitor disposed in series, wherein a capacitance of the LC capacitor is variable depending on a deformation of the LC layer.

In one exemplary embodiment, the first touch sensor and the second touch sensor each includes at least one thin film transistor including at least one amorphous silicon layer pattern.

BRIEF DESCRIPTION OF THE DRAWINGS

The accompanying drawings briefly described below illustrate exemplary embodiments of the present invention and, together with the description, serve to explain the principles of the present invention, in which:

FIG. 7C is a table illustrating an exemplary embodiment of a method to distinguish between a touch and non-touch event;

DETAILED DESCRIPTION OF THE INVENTION

Figure 1:
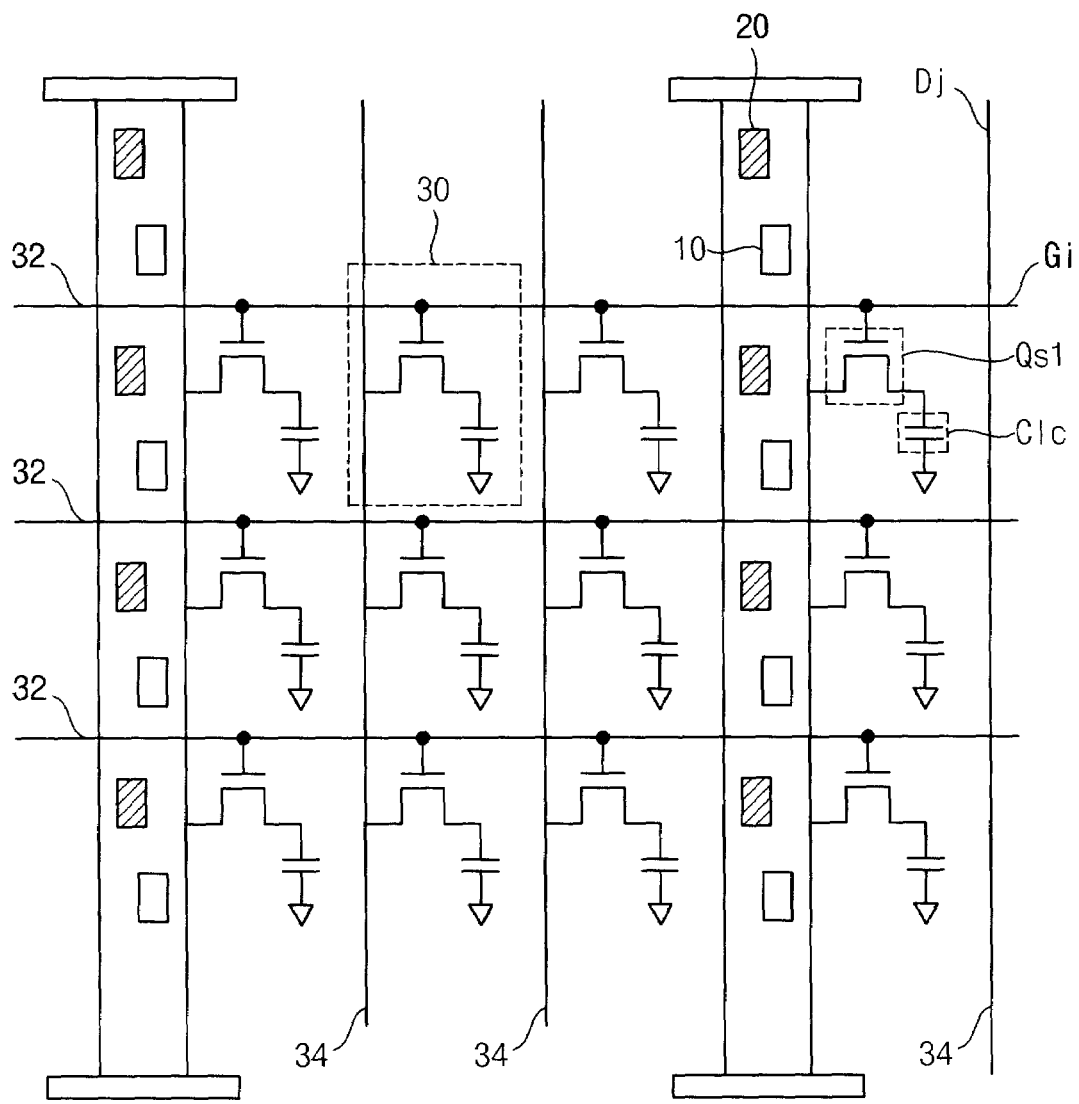
FIG. 1 is a block diagram of an exemplary embodiment of a liquid crystal display device ("LCD")

The invention now will be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings.

An exemplary embodiment of a liquid crystal display ("LCD") according to the present invention now will be described in detail with reference to FIGS. 1, 2, 3, 4 and 5.

Figure 2:
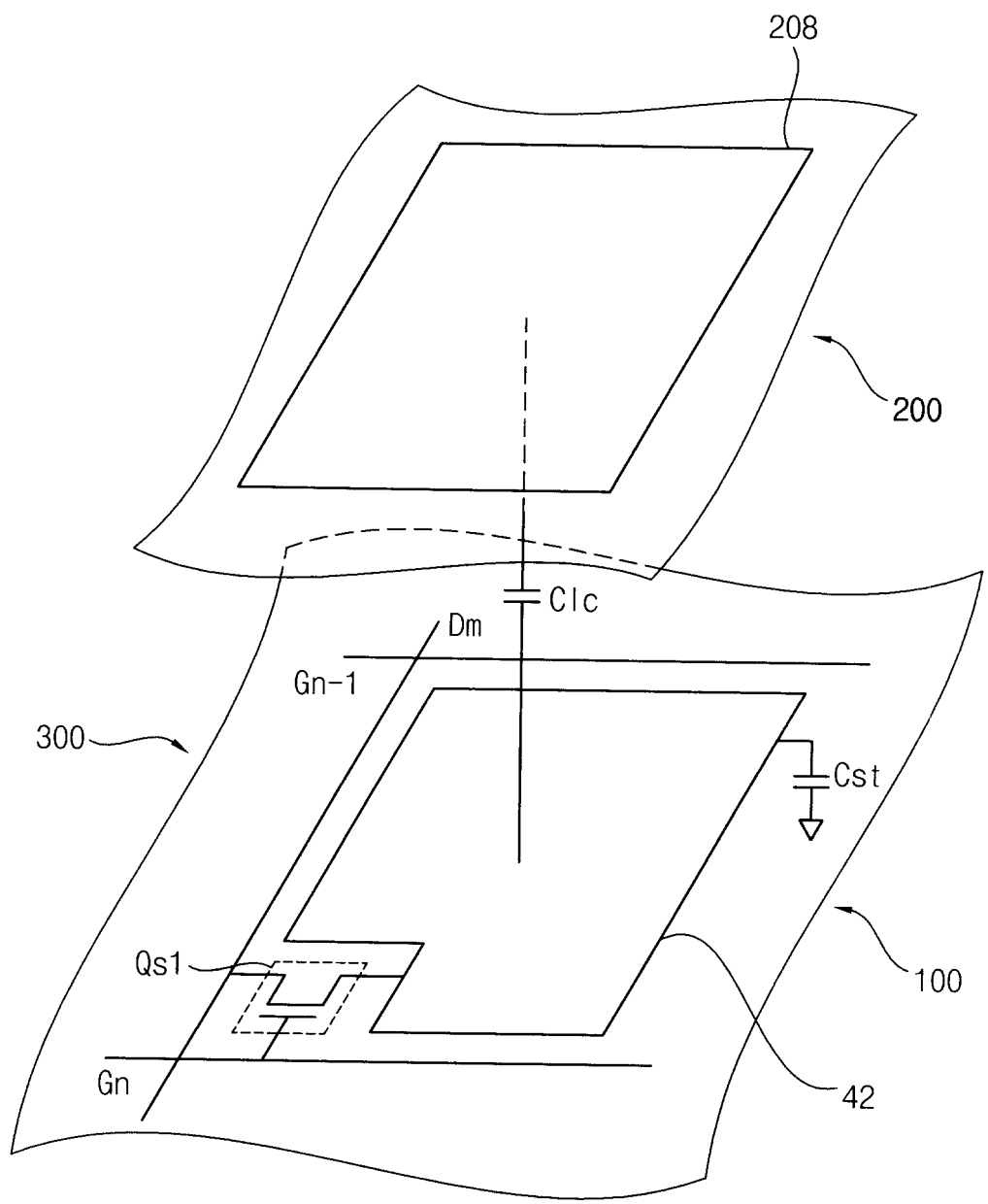
FIG. 2 is an equivalent circuit diagram of an exemplary embodiment of a pixel unit of the exemplary embodiment of an LCD of FIG. 1.

FIG. 1 is a block diagram of an exemplary embodiment of an LCD, FIG. 2 is an equivalent circuit diagram of an exemplary embodiment of a pixel unit 30 of the exemplary embodiment of an LCD of FIG. 1.

Referring to FIG. 1, an exemplary embodiment of an LCD includes a plurality of pixel units 30. The LCD further includes a first touch sensor 10 and a second touch sensor 20.

The LCD includes a plurality of display signal lines 32 and 34, the plurality of pixel units 30 connected to the display signal lines 32 and 34 and arranged substantially in a matrix pattern, and a plurality of the first and second touch sensors 10 and 20 arranged between pixel units 30.

The display signal lines 32 and 34 include a plurality of gate lines G1-Gn 32 transmitting image scanning signals and a plurality of data lines D1-Dm 34 transmitting image data signals.

A plurality of touch sensors 10 and 20 are positioned under transmittance windows (not shown) surrounded by a black matrix (not shown), which is a light shielding material, and in one exemplary embodiment the transmittance windows partially overlapped with the black matrix. A first transmittance window aligned with the first touch sensor 10 has a different transmittance from a second transmittance window aligned with the second touch sensor 20 so that adjacent touch sensors 10 and 20 under the first and second transmittance windows receive different incident light and generate different signals.

In the present exemplary embodiment, each of the first and second touch sensors 10 and 20 include a photo sensor or a combination of a photo sensor and a mechanical sensor. The photo sensor is a device for sensing incident light and the mechanical sensor is a device for sensing deformation of a liquid crystal ("LC") layer. At least one of the first and second transmittance windows is aligned with the photo sensor. Exemplary embodiments include configurations wherein the touch sensors 10 and 20 may be arranged repeatedly every three pixel units or six pixel units in a horizontal direction. Alternative exemplary embodiments include configurations wherein the repetition frequency is increased or decreased. Photo sensors of adjacent touch sensors 10 and 20 can generate different signals respectively using the difference in incident light due to the difference in transmittance of the first and second transmittance windows.

Referring to FIG. 2, a pixel unit 30 in the i-th row (i=1, 2, . . . , n) and the j-th column (j=1, 2, . . . , m) includes a switching element Qs1 connected to a gate line Gi and a data line Dj. In addition, the pixel unit 30 includes an LC capacitor Clc and a storage capacitor Cst that are connected to the LC capacitor Clc. Exemplary embodiments include configurations wherein the storage capacitor Cst may be omitted.

The switching element Qs1 is disposed in the lower panel 100 and has three terminals, a control terminal connected to the gate line Gi, an input terminal connected to the data line Dj, and an output terminal connected to the LC capacitor Clc and the storage capacitor Cst.

The LC capacitor Clc includes a pixel electrode 42 disposed in the lower substrate 100 and a common electrode 208 disposed in the upper substrate 200 which together function as the two electrodes of the LC capacitor Clc. The LC layer 300 is disposed between the two electrodes 42 and 208 and functions as a dielectric material for the LC capacitor Clc. The pixel electrode 42 is connected to the switching element Qs1, and the common electrode 208 is applied with a common voltage Vcom.

In the exemplary embodiment wherein the display is a color display, each pixel unit 30 uniquely represents a primary color so that a spatial sum of the primary colors is recognized as a desired color. An exemplary embodiment of a set of the primary colors includes red, green, and blue. In one exemplary embodiment, the color filter (not shown) is provided in an area of the upper substrate 200 facing the pixel electrode 42. Alternative exemplary embodiments include configurations wherein the color filter may be provided on or under the pixel electrode 42 in the lower substrate 100.

Figure 3:
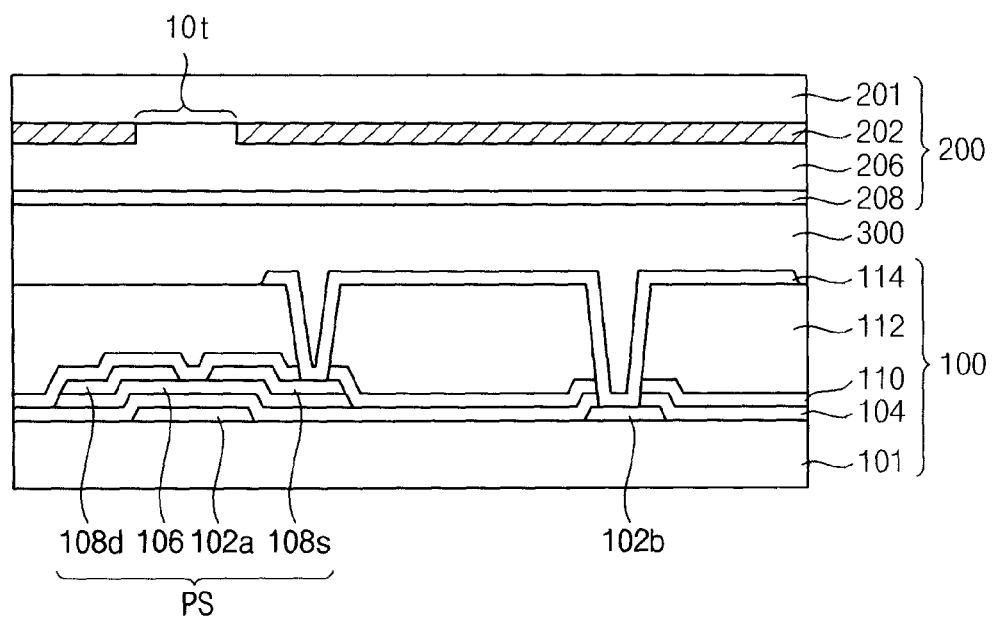
FIG. 3 and 4 are schematic cross-sectional views of exemplary embodiments of photo sensors of an exemplary embodiment of an LCD.
Figure 4:
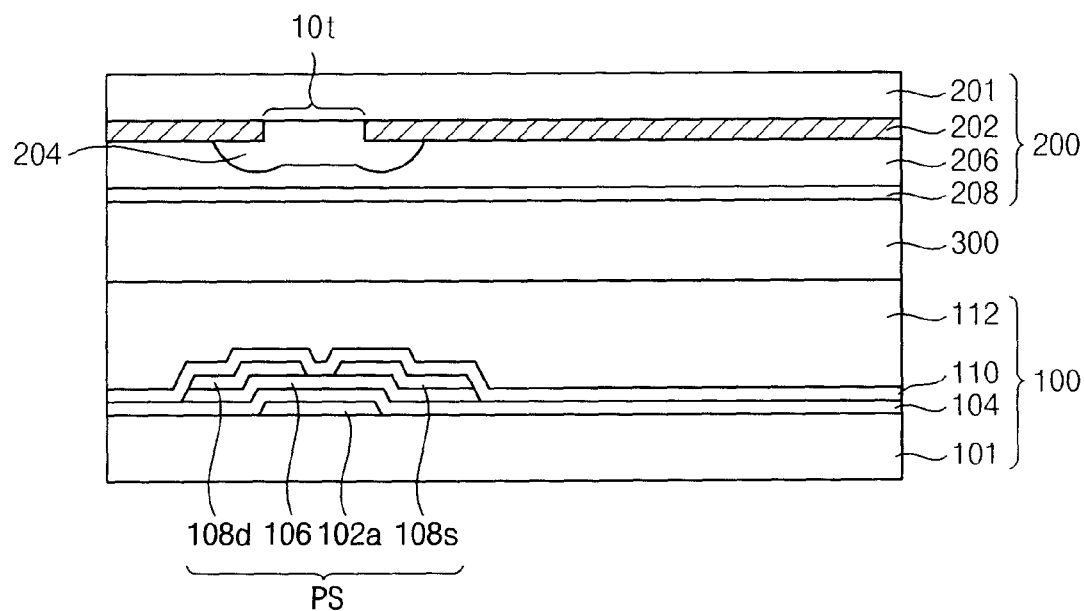
Figure 5:
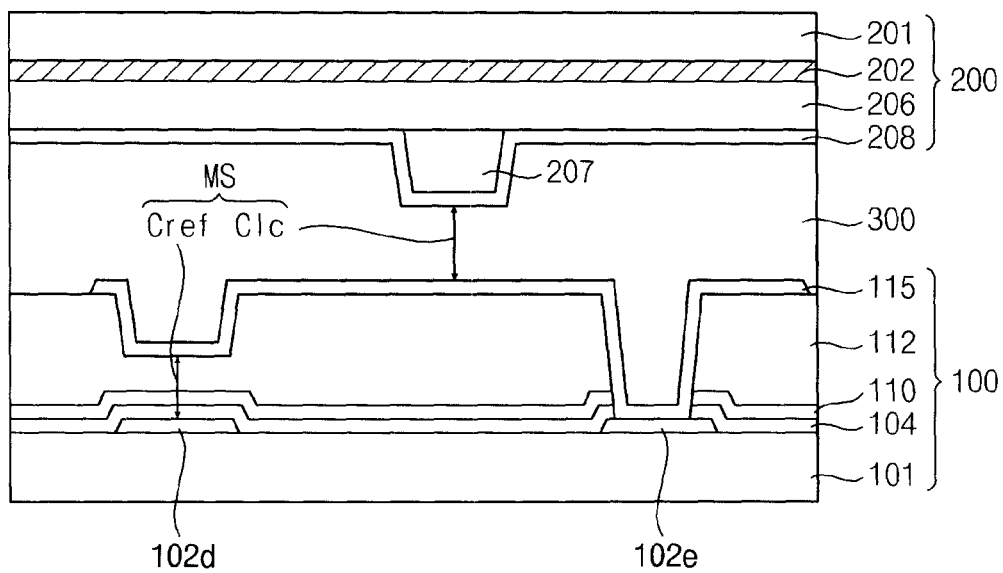
FIG. 5 is a schematic cross-sectional view of a mechanical sensor of an exemplary embodiment of an LCD.

FIGS. 3 and 4 are schematic cross-sectional views of exemplary embodiments of photo sensors of an exemplary embodiment of an LCD, and FIG. 5 is a cross-sectional image of an exemplary embodiment of a mechanical sensor of an exemplary embodiment of an LCD. In one exemplary embodiment, the mechanical sensor may supplement a photo sensor.

Referring to FIG. 3, each of the first and second touch sensors 10 and 20 (as shown in FIG. 1) includes a photo sensor PS which includes a control voltage line 102a, a first voltage line 108d and a second voltage line 108s. In one exemplary embodiment, the second voltage line 108s may be connected to another signal line 102b. A bridge line 114 may be formed over the insulation layers 104, 110 and 112 as illustrated in FIG. 3. Although not shown, the first voltage line 108d may be connected to the control voltage line 102a. In the present exemplary embodiment, the photo sensor PS is disposed on a first insulating substrate 101.

A transmittance window 10t is formed on the photo sensor PS for receiving incident light. A black matrix 202 is formed around the transmittance window 10t. In one exemplary embodiment, the black matrix 202 surrounds the transmittance window 10t. In one exemplary embodiment, an overcoat layer 206 may be formed on the black matrix 202 and the transmittance window 10t. An LC layer 300 is interposed between the lower panel 100 and the upper panel 200. In the present exemplary embodiment, the common electrode 208 and the bridge line 114 are made of a transparent material, exemplary embodiments of which include indium tin oxide ("ITO"), indium zinc oxide ("IZO") or other materials having similar characteristics. In the present exemplary embodiment, the upper panel 200 includes a second insulating substrate 102.

The Photo sensor PS includes an amorphous silicon pattern 106 disposed under the transmittance window 10t. The amorphous silicon pattern 106 generates a photo current indicating when light is received so that electrons move toward a higher voltage level from a lower voltage level. Exemplary embodiments include configurations wherein the photo sensor PS may function as a switching element according to voltages applied to the control voltage line 102a. The photo sensor PS may be reset or refreshed according to voltages supplied along the control voltage line 102a.

If the first voltage line 108d is applied with a higher voltage than that of the second voltage line 108s and then the first voltage line 108d is isolated, the higher voltage of the first voltage line 108d is sustained or lowered depending on touch or non-touch events. The touch or non-touch event can be detected by detecting a voltage change of the first voltage line 108d. The first voltage line 108d may be directly connected to a read-out line, or control another switching element (not shown) which is connected to a voltage supplying line (not shown) and a read-out line.

Exemplary embodiments of the photo sensor PS may have substantially the same stack structure as the switching element Qs1 of the pixel units 30 (shown in FIGS. 1 and 2) but may have a different channel length and width.

Referring to FIG. 4, the exemplary embodiment of a photo sensor PS of FIG. 4 is substantially the same as the exemplary embodiment shown in FIG. 3, except for a shade 204 which is formed at the transmittance window 10t, and the omission of a bridge line connecting a second voltage line 108s to another signal line as illustrated in FIG. 3. Alternative exemplary embodiments include configurations wherein the bridge line 114 is included in the configuration shown in FIG. 4, similar to that illustrated in FIG. 3.

In the present exemplary embodiment, the shade 204 is made of a color filter or semi-transparent material. In one exemplary embodiment, the shade 204 may be made from substantially the same material as that of the color filter of a pixel unit 30 (shown in FIG. 1). In one exemplary embodiment, the shade 204 may be made from substantially the same material as a color filter of an adjacent pixel unit 30. Exemplary embodiments include configurations wherein the shade 204 can be any color such as a red color filter, a green color filter, a blue color filter or any other color or combination thereof. Exemplary embodiments of the semi-transparent material include an organic or non-organic material and may be substantially the same material as that used in the pixel unit 30.

A photo sensor PS of FIG. 4 which is positioned under the shade 204 generates a photo current different from that of the photo sensor PS of FIG. 3 due to the different intensities of incident light. Specifically, light sensed by the photo sensor PS of FIG. 3 has a first intensity corresponding to unfiltered ambient light, and the light sensed by the photo sensor PS of FIG. 4 has a second intensity corresponding to the dimming or filtering effect of the shade 204.

Touch or non-touch events can be more exactly detected regardless of the location of the photo sensors PS through the detection of these different photo currents. The distinction between touch and non-touch events will be explained below in detail.

Referring to FIG. 5, a mechanical sensor MS includes two capacitors with Cref and Clc capacitances, respectively. The mechanical sensor MS includes a reference capacitor having a reference capacitance Cref formed between a reference voltage line 102d and a first electrode 115. The mechanical sensor MS also includes an LC capacitor having an LC capacitance Clc formed between the first electrode 115 and common electrode 208 and which is varied by an exterior stimulus, e.g. a compression force reducing a distance between the first electrode 115 and the common electrode 208. The common electrode 208 is formed on a protrusion 207 and protrudes toward the first electrode 115. A distance between a portion of the common electrode 208 covering the protrusion 207 and the first electrode 115 is reduced by an exterior stimulus so that the capacitance Clc can be increased. The protruded common electrode 208 increases the sensitivity of the capacitance Clc to the touch and non-touch events because the capacitance Clc is inversely proportional to the distance.

In one exemplary embodiment, the mechanical sensor MS may be used for supplementing the photo sensor PS. In such an exemplary embodiment, the mechanical sensor MS can be connected to the first voltage line 108d (shown in FIGS. 3 and 4). When the touch event occurs, a voltage of the first voltage line 108d can be sustained because a photo current isn't generated. Furthermore a thickness of the LC layer 300 can be reduced through a touch with respect to the upper panel 200 so that the capacitance Clc can be increased. Although the increased capacitance effectively sustains the voltage of the first voltage line 108d, leakage is caused by the characteristics of amorphous silicon patterns 106 (shown in FIGS. 3 and 4).

In one exemplary embodiment, the protrusion 207 is formed and integrated with the overcoat layer 206 which is formed on the black matrix 202. In one exemplary embodiment, the protrusion 207 may be made from substantially the same material as the overcoat layer 206.

FIGS. 6A, 6B7A and 7B are graphs illustrating an exemplary embodiment of a method to distinguish between a touch and non-touch event. FIGS. 6C and 7C are tables illustrating an exemplary embodiment of the method to distinguish between touch and non-touch events.

Figure 6A:
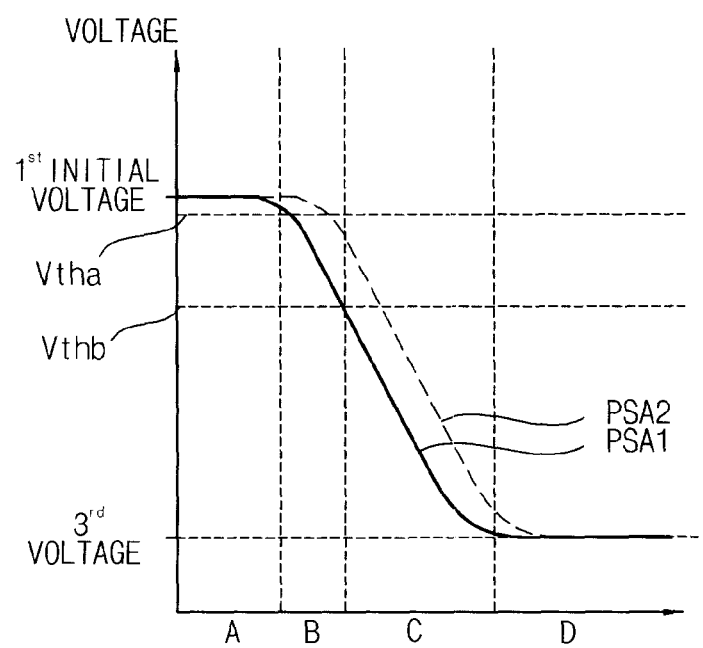
FIGS. 6A and 6B, are graphs illustrating an exemplary embodiment of a method to distinguish between a touch and non-touch event.
Figures 6B, 6C:
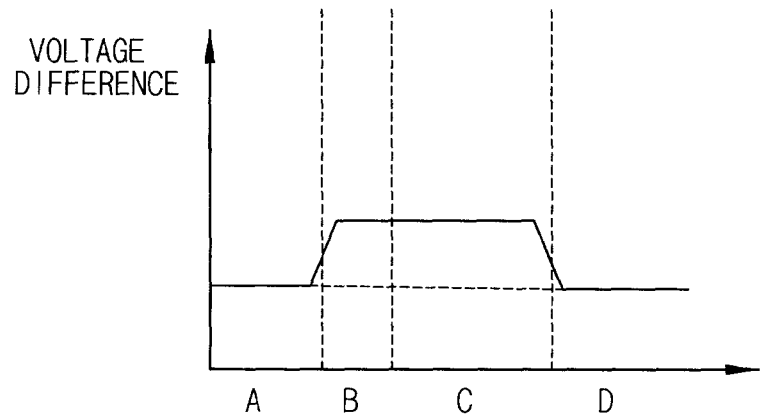
FIG. 6C is a table illustrating an exemplary embodiment of a method to distinguish between a touch and non-touch event.
Figure 7A:
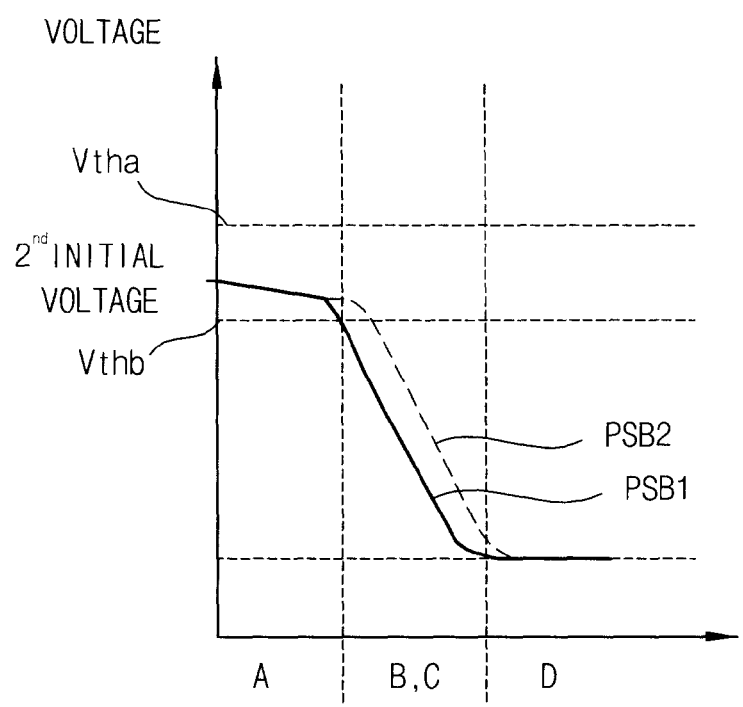
FIGS. 7A and 7B, are graphs illustrating an exemplary embodiment of a method to distinguish between a touch and non-touch event.
Figure 7B:
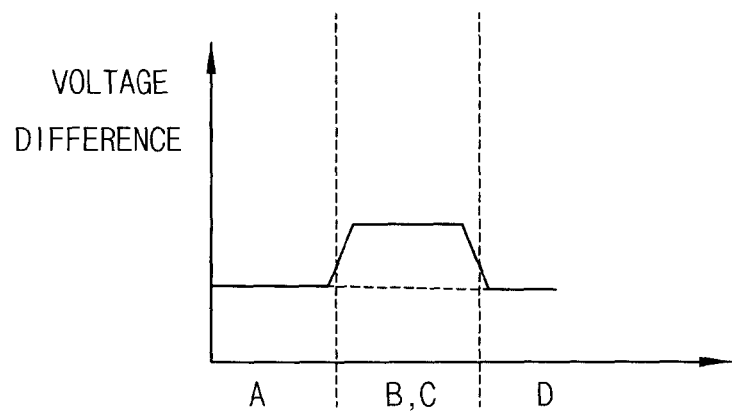
Figure 7C:
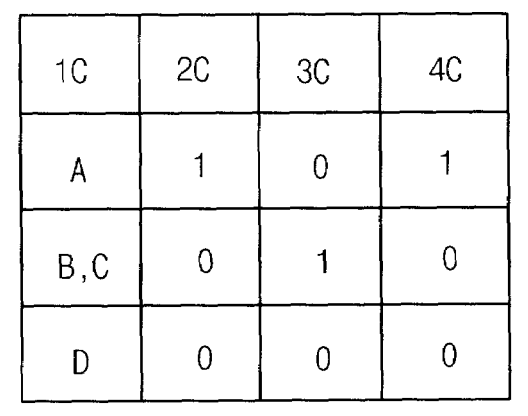

FIGS. 6A, 6B, 6C illustrate voltage changes of a first photo sensor PSA. FIGS. 7A, 7B and 7C illustrate voltage changes of a second photo sensor PSB which is separated from the first photo sensor PSA. In the present exemplary embodiment, the first and second photo sensors PSA and PSB each include two adjacent photo sensors (PSA1, PSA2; PSB1, PSB2), respectively. In one exemplary embodiment, PSA1 and PSB1 are photo sensors according to the exemplary embodiment illustrated in FIG. 3. In one exemplary embodiment, PSA2 and PSB2 are photo sensors according to the exemplary embodiment illustrated in FIG. 4 which have the shades 204 disposed thereon.

In FIGS. 6A and 7A, a vertical axis represents voltages of the first voltage line 108d and the horizontal axis represents situations which vary from a touch event to a non-touch event. Time interval 'A' is an interval of a touch event and time intervals 'B', 'C' and 'D' are intervals that vary from a touch event to a non-touch event, e.g., the time period during which a finger or stylus is removed after initially contacting the display. In particular, time intervals 'B' and 'C' are intervals influenced by a shadow when a touch event is changed to a non-touch event.

In FIGS. 6B and 7B, the vertical axis represents a voltage difference between the PSA1 and PSA2 in FIG. 6B, or in FIG. 7B PSB1 and PSB2, and the horizontal axis represents time periods similar to that of FIGS. 6A and 7A.

In FIGS. 6C and 7C, the first column 1C represents the time intervals as discussed with respect to FIGS. 6A, 6B, 7A and 7B. A second column 2C represents a first digital value based on FIGS. 6A and 7A. A third column 3C represents a second digital value based on FIGS. 6B and 7B. And the fourth column 4C represents judgments of the touch and non-touch events based on the first and second digital values.

Referring to FIGS. 6A and 7A, initial voltages are charged at the first voltage lines 108d (shown in FIG. 3 and 4) during refresh processes. The initial voltages are changed into a first initial voltage of photo sensor PSA and a second initial voltage of photo sensor PSB by the leakage of amorphous silicon patterns such as a photo current and so on. The leakage depends on the characteristics of amorphous silicon patterns 106 (shown in FIGS. 3 and 4) and it is different according to the location of the photo sensors.

When a touch event occurs on the LCD surface, photo currents are not generated in the photo sensors PSA and PSB so that the first and second initial voltages are sustained. When the touch event is changed into a non-touch event, the first or second initial voltages are reduced into a third voltage following two separate waveforms as shown in the voltage of PSA1 and PSA2 in FIG. 6A or in two separate waveforms as shown in the voltage of PSB1 and PSB2 in FIG. 7A. The photo currents in the photo sensors PSA2 and PSB2 are less than that in the photo sensors PSA1 and PSB1. Therefore, voltages of photo sensors PSA2 and PSB2 are reduced more slowly than that of photo sensors PSA1 and PSB1.

If the threshold voltage of the photo sensor PSA for touch and a non-touch events is set to Vthb, the 'B' section of PSA can be evaluated as being a touch event in spite of it being in actuality a period associated with a non-touch event: here a voltage above the Vthb is evaluated as the touch event and a voltage under the Vthb as a non-touch event. If the threshold voltage of PSB for touch and non-touch events is set to Vtha, all sections of PSB can be evaluated as a non-touch event in spite of there actually being a touch event, e.g., see especially section A of FIG. 7A. So, for reducing the erroneous evaluations, the threshold voltage is commonly set to be Vthb, which is based on the photo sensor having a high amount of initial leakage.

Referring to FIGS. 6B and 7B, the time interval 'B' of PSA can be discerned through the comparison of voltages of PSA1 and PSA2, when Vthb is selected. FIGS. 6B and 7B illustrate the voltage difference between PSA1 and PSA2 or PSB1 and PSB2, respectively. Time intervals 'A' and 'D' are periods when voltages of the photo sensors PSA1 and PSA2 (or the photo sensors PSB1 and PSB2) are substantially the same. Time intervals 'B' and 'C' are periods when voltages of PSA1 and PSA2 (or PSB1 and PSB2) are different. Thus by using the voltage difference of PSA1 and PSA2 for judging the non-touch event, the erroneous evaluation of time interval 'B' can be corrected.

Referring to the tables in FIGS. 6C and 7C, they illustrate the above correction in greater detail. In the second column 2C, '1' indicates the detection of a touch event and '0' indicates the detection of a non-touch event. In the third column 3C, '1' indicates the detection of a voltage difference between PSA1 and PSA2 (or PSB1 and PSB2) and '0' indicates the detection of no voltage difference. In the fourth column 4C, '1' indicates the determination of a touch event and '0' indicates the determination of a non-touch event, based on digital values of the second and third column.

In the fourth column 4C, a combination of the first digital value '1' of the second column 2C and the second digital value '1' of the third column 3C represents '0' which means a non-touch event. Thus time interval 'B' can be judged as a non-touch event. Another combination of the first digital value '1' and the second digital value '0' represents '1' which means a touch event and another combination of the first digital value '0' and the second digital value '1' or '0' represents '0' which means a non-touch event.

Figure 8:
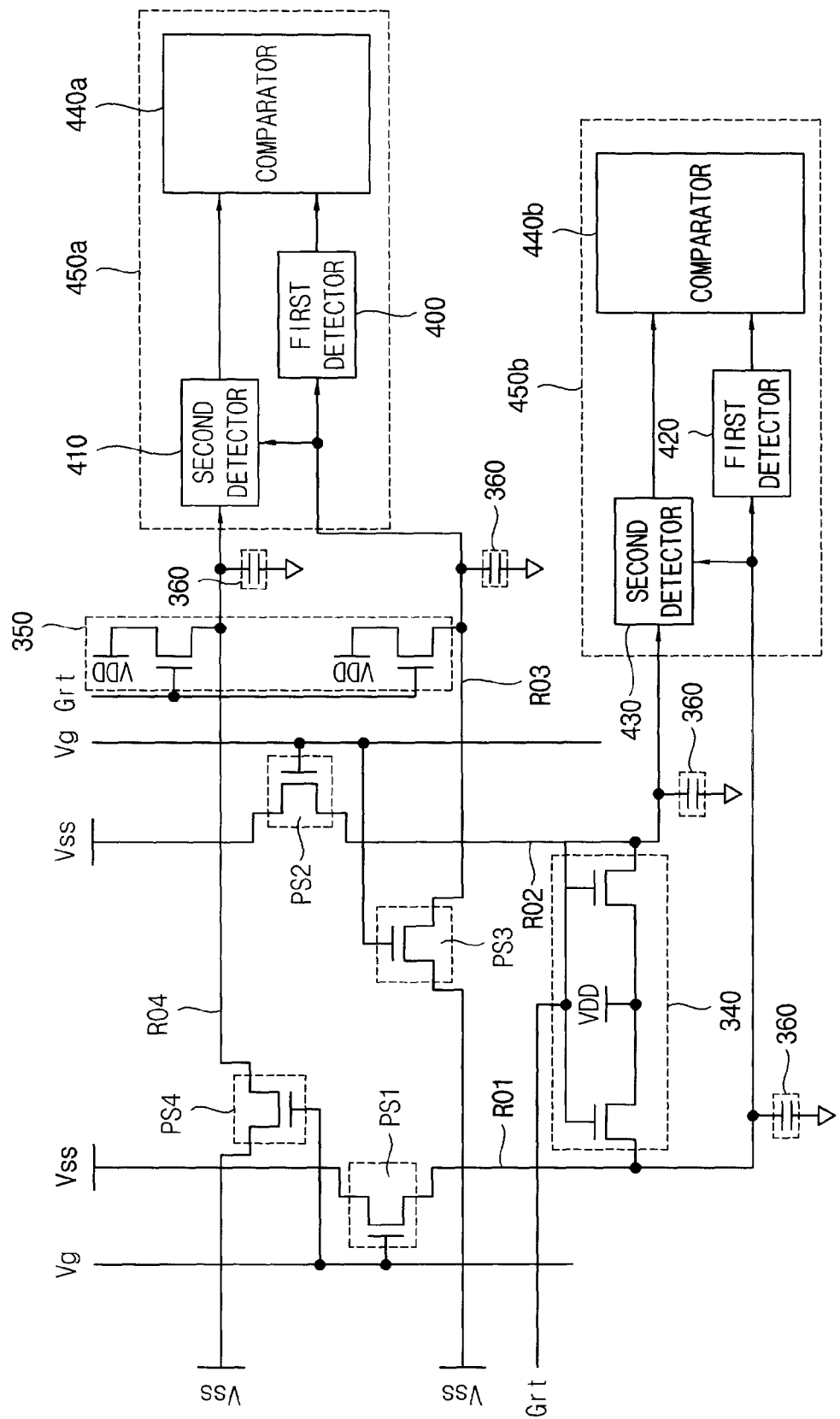
FIG. 8 is a circuit diagram illustrating a first exemplary embodiment of a circuit having the touch sensor according to the present invention.
Figure 9:
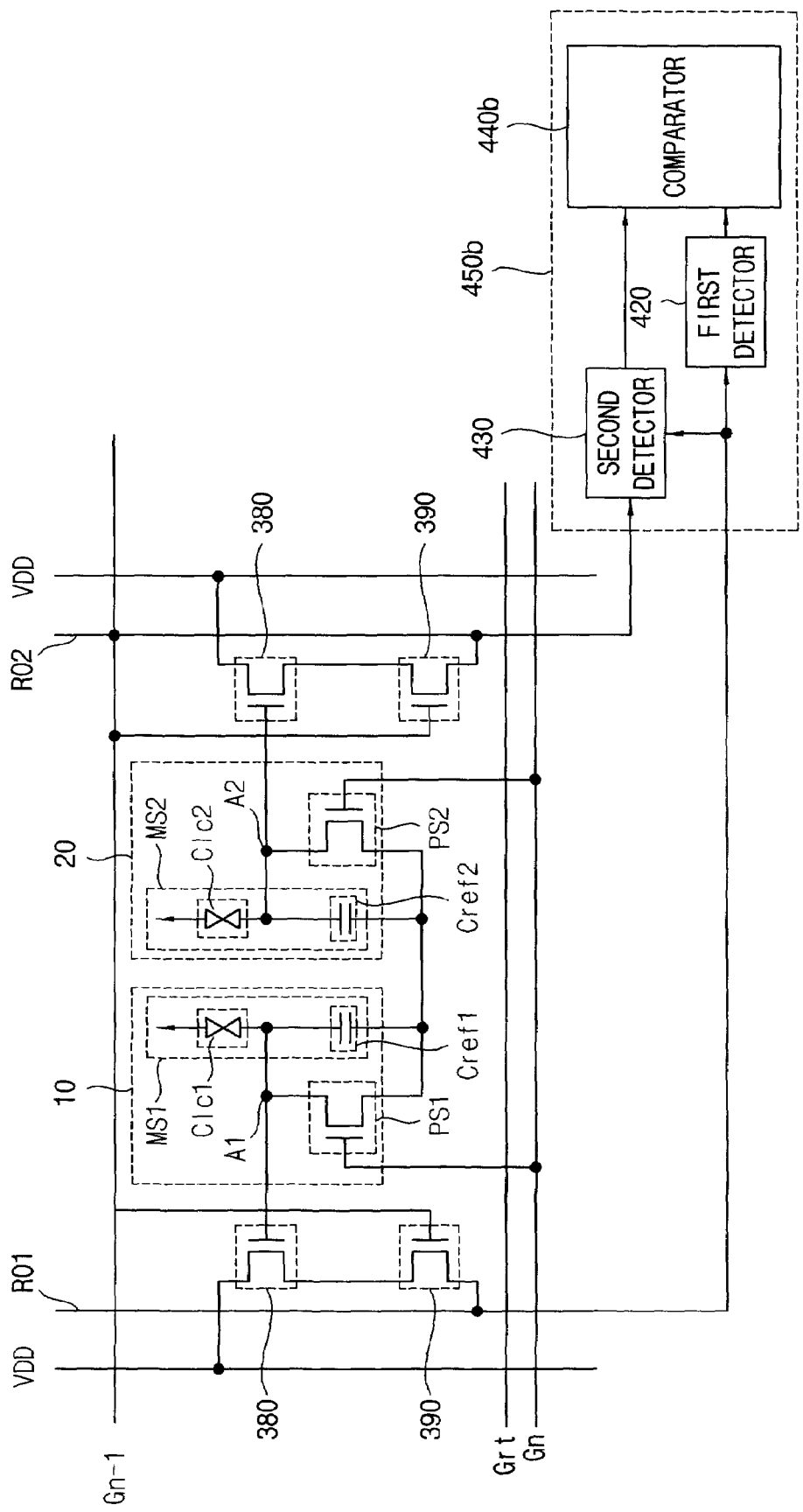
FIG. 9 is a circuit diagram illustrating a second exemplary embodiment of a circuit having the touch sensor according to the present invention.
Figure 10:
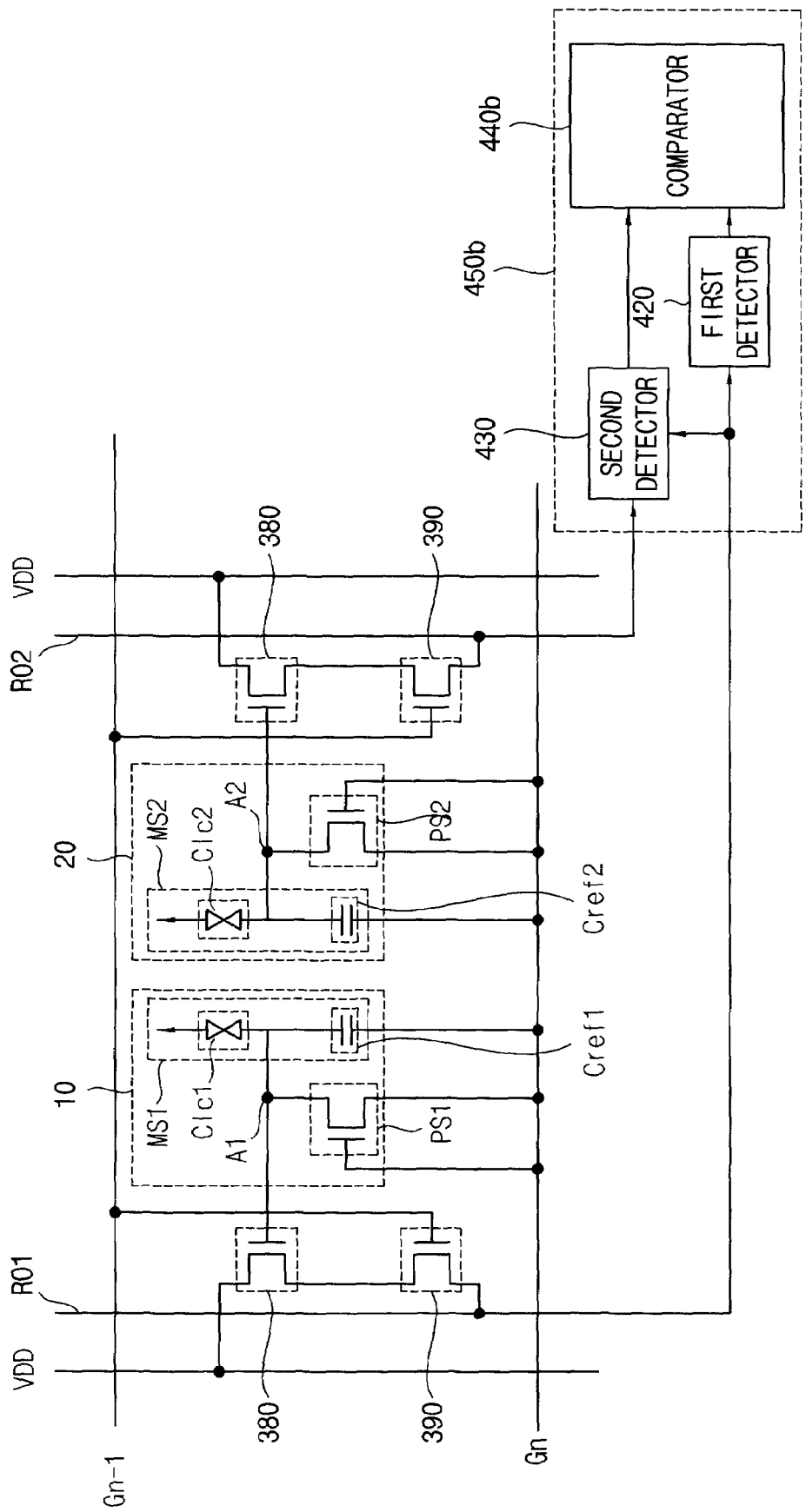
FIG. 10 is a circuit diagram illustrating a third exemplary embodiment of a circuit having the touch sensor according to the present invention.

FIGS. 8 to 10 are circuit diagrams of an exemplary embodiment of circuits having a touch sensor according to the present invention.

Referring to FIG. 8, there are photo sensors PS1 to PS4 which are connected to vertical read-out lines RO1 and RO2 substantially parallel to the data lines of the pixel units and connected to horizontal read-out lines RO3 and RO4 substantially parallel to the gate lines of the pixel units, respectively. The photo sensors PS1 to PS4 are connected to a first reader 450a or a second reader 450b. Shades (not shown) are formed above the photo sensor PS2 which is connected to the vertical read-out line RO2 and the photo sensor PS4 which is connected to the horizontal read-out lines RO4, respectively.

Exemplary embodiments include configurations wherein a plurality of photo sensors PS1 to PS4 can be arranged repetitively in a vertical direction and a horizontal direction. In one exemplary embodiment, each of the photo sensors PS1 to PS4 may be connected to other photo sensors in series.

Each reader 450a and 450b includes first detectors 400 and 420, second detectors 410 and 430, and comparators 440a and 440b, respectively. The first detectors 400 and 420 are connected to the horizontal read-out line RO3 and the vertical read-out line RO1 respectively, whereas the second detectors 410 and 430 are connected to both of the horizontal read-out lines RO3 and RO4, and both of the vertical read-out lines RO1 and RO2, respectively for comparing signals. The first and second detectors 400, 410, 420 and 430 may be analog-digital converters for generating digital signals like the second and third columns 2C and 3C shown in FIGS. 6C and 7C.

Each of comparators 440a and 440b is connected to both the first and second detectors 400 and 410 (or 420 and 430) for performing a judgment of touch and non-touch events.

Exemplary embodiments include configurations wherein refreshing units 340 and 350 may be connected between the photo sensors PS1 to PS4 and the first and second detectors 400, 410, 420, and 430. According to on-signals of 'Grt' lines, capacitors 360 of read-out lines RO1 to RO4 can be charged into initial voltages VDD. During this time when the initial voltages are charged, 'Vg' lines also apply on-signals to the photo sensors PS1 to PS4. The charged initial voltages VDD of the capacitors 360 can be decreased to the reduced voltages through leakage of the photo sensors PS1 to PS4 which is caused by non-uniform characteristics of amorphous silicon patterns. But the reduced voltages are higher than a voltage source source VSS voltage.

The read-out lines RO1 to RO4 are positioned between the 'Vg' lines. In one exemplary embodiment, the interference of the read-out lines RO1 to RO4, which is caused by data or gate signals, can be decreased because the 'Vg' lines are applied with a DC signal except during the refresh period.

When a touch event occurs, the reduced voltages of the read-out lines RO1 to RO4 are sustained so that the first and second detectors 400, 410, 420 and 430 can detect the reduced voltages. When a non-touch event occurs, the reduced voltages of the read-out lines RO1 to RO4 are changed substantially toward the 'VSS' voltage by the photo currents so that the first and second detectors 400, 410, 420 and 430 can detect voltage changes.

The judgment of a touch and non-touch event is substantially the same as described with respect to the description of the FIGS. 6C and 7C.

Referring to FIG. 9, another exemplary embodiment of a circuit includes a configuration wherein there are touch sensors 10 and 20 which are connected to vertical read-out lines RO1 and RO2 substantially parallel to the data lines. The touch sensors 10 and 20 include photo sensors PS1 and PS2 and mechanical sensors MS1 and MS2. Each of the mechanical sensors MS1 and MS2 include an LC capacitor Clc1 (or Clc2) and a reference capacitor Cref1 (or Cref2) which are connected in series. A shade (not shown) is formed above the photo sensor PS2. Each of the photo sensors PS1 and PS2 is connected to a node A1 (or node A2) between the LC capacitor Clc1 (or Clc2) and the reference capacitor Cref1 (or Cref2). The nodes A1 and A2 are connected to control terminals of first switch elements 380, respectively.

Each of the first switch elements 380 is connected to a 'VDD' line and a second switch element 390. According to signals of a previous gate line Gn-1, the second switch elements are turned on or off.

Exemplary embodiments include configurations wherein a plurality of touch sensors 10 and 20 can be arranged repeatedly in a vertical direction and a horizontal direction. And vertical read-out lines RO1 and RO2 are commonly connected to second switch elements of other touch sensors, respectively.

During a refresh process, the photo sensors PS1 and PS2 are turned on according to an on-signal of a gate line Gn and a refresh signal from the 'Grt' line is applied to the nodes A1 and A2 so that the nodes A1 and A2 are charged with initial voltages of the refresh signal. After the refresh process, the 'Grt' line is applied with an off-voltage. The initial voltages can be decreased to reduce voltages for the same reason as explained with reference to FIG. 8. But the reduction amounts are smaller than that of the FIG. 8 because capacitors Clc1, Clc2, Cref1 and Cref2 of the mechanical sensors MS1 and MS2 are connected to the photo sensors PS1 and PS2.

A first detector 420 is connected to the vertical read-out line RO1, whereas a second detector 430 is connected to both of the vertical read-out lines RO1 and RO2 for comparing the signals.

When the touch event occurs, the reduced voltages of the nodes A1 and A2 are sustained so that the first switches 380 are turned on and 'VDD' voltages pass through the first switches 380. Furthermore the LC capacitors are increased due to the reduction of the corresponding cell gap so that the reduced voltages of the nodes A1 and A2 are further effectively sustained as compared to the exemplary embodiment illustrated in FIG. 8. Thus when the second switches are turned on according to the on-signal of the previous gate line Gn-1, the first and second detectors 420 and 430 can detect the 'VDD' voltages. When a non-touch event occurs, the reduced voltages of the nodes A1 and A2 are changed toward the off-voltage of the Grt line by the photo current. Thus when the second switches 380 are turned on according to the signal of the previous gate line Gn-l, the first and second detector can detect the voltages less than the 'VDD' voltages.

The first switches 380 may have the threshold voltage Vthb of FIGS. 6A, 6B, 6C, 7A, 7B and 7C. The voltages of the vertical read-out lines RO1 and RO2 when a non-touch event occurs are different from each other, similar to FIGS. 6A and 7A. Because voltages between the first switches 380 and the second switches 390 are drastically changed around the threshold voltage applied to the first switches 380, the judgment of a touch or non-touch event can be corrected by the voltage difference of the vertical read-out lines RO1 and RO2.

In one exemplary embodiment, the vertical read-out lines RO1 and RO2 are positioned between the 'VDD' lines.

Referring to FIG. 10, the circuit diagram of an exemplary embodiment of a circuit illustrated in FIG. 10 is substantially the same as the exemplary embodiment of a circuit illustrated in FIG. 9 except for the 'Grt' line. Thus the description of FIG. 9 is substantially similar to FIG. 10 In this exemplary embodiment, the 'Grt' line is omitted. The photo sensors PS1 and PS2 and the mechanical sensor MS1 and MS2 are connected to the gate line Gn instead of the 'Grt' line. The circuit diagram of FIG. 10 has a positive aspect in that the 'Grt' line is removed. During the refreshing process, a selection of an initial voltage, which is applied to the nodes A1 and A2, is limited because the same voltage as the gate voltage is applied to nodes A1 and A2, as compared to the previous exemplary embodiment of a circuit illustrated in FIG. 9.

While the invention has been shown and described with reference to exemplary embodiments thereof, it will be understood by those skilled in the art that various changes in form and details may be made therein without departing from the spirit and scope of the invention as defined by the appended claims.

What is claimed is:

1. A display device comprising:
a first touch sensor;
a second touch sensor disposed in proximity to the first touch sensor;
a shade located on the second touch sensor wherein the shade controls intensity of incident light to the second touch sensor so that the second touch sensor receives the incident light transmitted through the shade having a different intensity than the incident light received by the first touch sensor;
a reader which receives a first signal and a second signal from the first touch sensor and the second touch sensor, respectively, and which analyzes the first signal and the second signal, and
a black matrix having a first transmittance window and a second transmittance window, wherein the first transmittance window is aligned with the first touch sensor and the second transmittance window is aligned with the second touch sensor,
wherein the shade is formed at the second transmittance window.

2. The display device of claim 1, wherein the shade includes a color filter layer.

3. The display device of claim 2, wherein the shade includes a combination of a plurality of color filter layers.

4. The display device of claim 1, the display device further comprising a plurality of pixel units arranged in a matrix pattern wherein the first touch sensor and the second touch sensor are located between individual pixel units of the plurality of pixel units.

5. The display device of claim 4, wherein the first touch sensor and the second touch sensor each comprise a photo sensor which senses incident light and a mechanical sensor which senses deformation of a liquid crystal layer.

6. A display device comprising:
a first touch sensor;
a second touch sensor disposed in proximity to the first touch sensor;
a shade located on the second touch sensor, wherein the shade controls intensity of incident light to the second touch sensor, so that the second touch sensor receives the incident light transmitted through the shade having a different intensity than the incident light received by the first touch sensor;
a black matrix having a first transmittance window and a second transmittance window, wherein the first transmittance window is aligned with the first touch sensor and the second transmittance window is aligned with the second touch sensor; and
a reader comprising:
a first detector which receives a first signal from the first touch sensor;
a second detector which receives the first signal and a second signal from the first touch sensor and the second touch sensor, respectively; and
a comparator which compares a third signal from the first detector and a fourth signal from the second detector,
wherein the shade is formed at the second transmittance window.

7. The display device of claim 6, the display device further comprising a plurality of pixel units arranged in matrix pattern wherein the first touch sensor and the second touch sensor are located between individual pixel units of the plurality of pixel units.

8. The display device of claim 6, wherein each of the first touch sensor and the second touch sensor comprise both a photo sensor which senses incident light and a mechanical sensor which senses deformation of a liquid crystal layer.

9. A display device having a plurality of pixel units arranged in a matrix, the display device comprising:
a first touch sensor comprising a first photo sensor;
a second touch sensor comprising a second photo sensor disposed in proximity to the first touch sensor;
a shade located on the second touch sensor, wherein the shade controls intensity of incident light to the second touch sensor, so that the second touch sensor receives the incident light transmitted through the shade having a different intensity than the incident light received by the first touch sensor,
a reader which receives a first signal and a second signal from the first touch sensor and the second touch sensor, respectively, and which analyzes the first and second signals; and
a black matrix having a first transmittance window and a second transmittance window, wherein the first transmittance window is aligned with the first touch sensor and the second transmittance window is aligned with the second touch sensor, wherein the first touch sensor and the second touch sensor are located between individual pixel units of the plurality of pixel units, and wherein the shade is formed at the second transmittance window.

10. The display device of claim 9, wherein at least one of the first touch sensor and the second touch sensor further comprises a mechanical sensor which senses deformation of a liquid crystal layer.

11. A display device comprising:
a first touch sensor;
a second touch sensor disposed in proximity to the first touch sensor;
a first read-out line electrically connected to the first touch sensor;
a shade located on the second touch sensor, wherein the shade controls intensity of incident light to the second touch sensor, so that the second touch sensor receives the incident light transmitted through the shade having a different intensity than the incident light received by the first touch sensor;
a second read-out line electrically connected to the second touch sensor;
a reader electrically connected to the first read-out line and the second read-out lines, wherein the reader receives a first signal and a second signal from the first touch sensor and the second touch sensor, respectively, and analyzes the first signal and the second signal;
a first supply line electrically connected to one of the first touch sensor and both the first touch sensor and the second touch sensor; and
a black matrix having a first transmittance window and a second transmittance window, wherein the first transmittance window is aligned with the first touch sensor and the second transmittance window is aligned with the second touch sensor,
wherein the first read-out line is located between the first supply line and the second touch sensor, and
wherein the shade is formed at the second transmittance window.

12. The display device of claim 11 further comprising a second supply line electrically connected to the second touch sensor, wherein the first supply line is electrically connected to the first touch sensor and the second read-out line is located between the second supply line and the first touch sensor.

13. The display device of claim 12, wherein the first touch sensor and the second touch sensor each comprise a photo sensor which senses incident light and a mechanical sensor which senses deformation of a liquid crystal layer.

14. The display device of claim 13, further comprising
a first switch operated by the photo sensor and the mechanical sensor of the first touch sensor and electrically connected to the first supply line; and
a second switch operated by a gate signal and electrically connected to the first switch and the reader.

15. The display device of claim 14, wherein the mechanical sensor comprises a liquid crystal capacitor and a reference capacitor connected in series, wherein a capacitance of the liquid crystal capacitor varies according to a deformation of the liquid crystal layer.

16. The display device of claim 15, wherein the photo sensor is connected to a first electrode of the liquid crystal capacitor, and wherein the first electrode is directly connected to a second electrode of the reference capacitor.

17. The display device of claim 16, the display device further comprising a plurality of pixel units arranged in a matrix pattern wherein the first touch sensor and the second touch sensor are located between individual pixel units of the plurality of pixel units.

18. The display device of claim 11, wherein the first touch sensor and the second touch sensor each comprise at least one thin film transistor including at least one amorphous silicon layer pattern.

19. The display device of claim 18, wherein the first touch sensor and the second touch sensor are substantially identical to each other.

20. The display device of claim 19, the display device further comprising a plurality of pixel units arranged in a matrix pattern wherein the first touch sensor and the second touch sensor are located between individual pixel units of the plurality of pixel units.

* * * * *